(12) United States Patent
Elia et al.

(10) Patent No.: US 8,263,213 B2
(45) Date of Patent: Sep. 11, 2012

(54) PAINTED COMPOSITE THERMOPLASTIC ARTICLES

(75) Inventors: Andri E. Elia, Chadds Ford, PA (US); Toshikazu Kobayashi, Chadds Ford, PA (US); William Daniel Saunders, Delaware City, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/999,139

(22) Filed: Dec. 4, 2007

(65) Prior Publication Data

US 2008/0176088 A1    Jul. 24, 2008

Related U.S. Application Data

(60) Provisional application No. 60/875,628, filed on Dec. 19, 2006.

(51) Int. Cl.
  *B32B 27/08* (2006.01)
  *B32B 27/18* (2006.01)
  *B32B 27/20* (2006.01)
  *B32B 27/34* (2006.01)
  *B32B 27/36* (2006.01)

(52) U.S. Cl. ........ 428/215; 428/212; 428/213; 428/323; 428/325; 428/364; 428/402; 428/474.4; 428/474.7; 428/474.9; 428/475.2; 428/475.8; 428/480

(58) Field of Classification Search .................. None
See application file for complete search history.

(56) References Cited

U.S. PATENT DOCUMENTS

| | | | | |
|---|---|---|---|---|
| 4,451,539 A * | 5/1984 | Vallee et al. | | 428/515 |
| 4,540,729 A * | 9/1985 | Williams | | 524/114 |
| 4,601,936 A * | 7/1986 | Ghavamikia | | 428/119 |
| 4,610,835 A * | 9/1986 | Ghavamikia | | 264/250 |
| 4,654,257 A * | 3/1987 | Murachi | | 428/317.1 |
| 4,668,565 A * | 5/1987 | Murachi | | 442/378 |
| 4,781,876 A * | 11/1988 | Kia | | 264/261 |
| 5,157,886 A * | 10/1992 | Azzar et al. | | 52/717.05 |
| 5,273,685 A * | 12/1993 | Takata et al. | | 252/511 |
| 5,284,681 A | 2/1994 | Shinonaga et al. | | |
| 5,418,026 A * | 5/1995 | Dronzek et al. | | 428/41.4 |
| 5,514,734 A * | 5/1996 | Maxfield et al. | | 523/204 |
| 5,616,418 A * | 4/1997 | Vasselin et al. | | 428/474.7 |
| 5,770,313 A | 6/1998 | Furumoto et al. | | |
| 5,985,465 A * | 11/1999 | Daichou et al. | | 428/458 |
| 6,017,610 A | 1/2000 | Abe et al. | | |
| 6,150,013 A * | 11/2000 | Balaji et al. | | 428/220 |
| 6,165,407 A * | 12/2000 | Tahara et al. | | 264/328.1 |
| 6,210,795 B1 * | 4/2001 | Nelson et al. | | 428/347 |
| 6,309,724 B1 * | 10/2001 | Kulper et al. | | 428/40.1 |
| 6,458,879 B1 * | 10/2002 | Grutke et al. | | 524/442 |
| 6,469,092 B1 | 10/2002 | Stoppelmann et al. | | |
| 6,551,671 B1 * | 4/2003 | Nishizawa et al. | | 428/34.1 |
| 6,572,971 B2 * | 6/2003 | Martin | | 428/414 |
| 6,620,473 B2 * | 9/2003 | Nishizawa et al. | | 428/35.7 |
| 6,858,283 B2 * | 2/2005 | Nishizawa et al. | | 428/137 |
| 6,956,081 B2 * | 10/2005 | Ebert et al. | | 524/494 |
| 7,008,991 B2 * | 3/2006 | Takagi et al. | | 524/496 |
| 7,029,735 B2 | 4/2006 | Flat et al. | | |
| 7,132,142 B2 * | 11/2006 | Truog et al. | | 428/40.1 |
| 7,390,454 B2 * | 6/2008 | Ostrander et al. | | 264/554 |
| 2002/0173584 A1 | 11/2002 | Ebert et al. | | 524/538 |
| 2005/0084637 A1 * | 4/2005 | Nishizawa et al. | | 428/35.7 |
| 2005/0238814 A1 | 10/2005 | Renken | | |
| 2006/0181777 A1 * | 8/2006 | Dunlap et al. | | 359/619 |
| 2007/0154710 A1 * | 7/2007 | Bradley | | 428/402 |
| 2008/0008879 A1 * | 1/2008 | Elia et al. | | 428/339 |
| 2008/0176079 A1 * | 7/2008 | Elia et al. | | 428/411.1 |
| 2008/0176090 A1 * | 7/2008 | Elia et al. | | 428/474.4 |

FOREIGN PATENT DOCUMENTS

| | | | |
|---|---|---|---|
| EP | 1 604 797 A1 | | 12/2005 |
| WO | WO 2004/081089 | * | 9/2004 |
| WO | WO 2007/143300 A2 | | 12/2007 |
| WO | WO 2007/149300 A1 | | 12/2007 |

OTHER PUBLICATIONS

Plastics—Determination of Densile Properties, Part 1.
Plastics—Determination of Tensile Properties—Part 2.
Plastics—Determination of charpy Impact Properties—Part 1.
Herbert, Michael; "Get the Roll Surface Right", Plastics Technology, Mar. 2004 (from http://www.ptonline.com/articles/get-the-roll-surface-right).
Surface Roughness Conversion Chart, Engineers Edge (from http://www.engineersedge.com/manufacturing/surface-roughness-conversion.htm).

* cited by examiner

*Primary Examiner* — Vivian Chen

(57) ABSTRACT

Painted composite articles having good mechanical properties and smooth surface appearance comprising a reinforced thermoplastic polymeric components, a film, and a coating.

16 Claims, No Drawings

PAINTED COMPOSITE THERMOPLASTIC ARTICLES

CROSS REFERENCE TO RELATED APPLICATIONS

This application claims the benefit of U.S. Provisional Application No. 60/875,628, filed Dec. 19, 2006.

FIELD OF THE INVENTION

The present invention relates to composite articles having good mechanical properties and smooth surface appearance. The articles comprise a reinforced thermoplastic polymeric component, a film, and a coating.

BACKGROUND OF THE INVENTION

The design flexibility afforded by many thermoplastic compositions and their relatively light weights and corrosion resistances make them attractive materials for many uses, including for the replacement of metal components in many applications. In many applications, including consumer items such as motor vehicles, recreational vehicles (including boats and other marine transport), appliances, tools (including power tools), electronics, furniture, and toys, the appearance, and in particular the smoothness, of the surface of a thermoplastic part is often important, particularly for customer acceptance of articles containing the thermoplastic parts in visual positions. However, thermoplastic compositions often possess an insufficient combination of stiffness, strength, toughness, and/or other physical properties to satisfy the requirements of many of these applications. Additives such as reinforcing agents, fillers, and impact modifiers may be used to improve the physical properties of the compositions, but the addition of such of additives often results in a finished part having a poorer surface appearance. In some cases, it may be possible to paint parts to obtain a good surface appearance and impart desired color and other properties, but in many cases, the poor surface appearance caused by many additives effective to improve properties cannot be sufficiently improved by painting the surface.

It would thus be desirable to obtain a thermoplastic article having good mechanical properties and a smooth surface when painted.

The article Brosius, Dale, "In-Mold Decorating Dresses up Composites," *Composites Technology* August 2005, discloses parts made by molding long fiber-reinforced thermoplastics (such as ABS and ABS blends and polyolefins) over preformed decorative films.

SUMMARY OF THE INVENTION

There is disclosed and claimed herein a composite article, comprising,
(a) a molded part having a surface and comprising a thermoplastic polymeric composition comprising at least one thermoplastic polymer and at least one reinforcing agent;
(b) a thermoplastic polymeric film having first and second surfaces opposite to each other; and
(c) a coating;
wherein the surface of the first component (a) is adhered to the first surface of the film (b) and wherein the second surface of film (b) is coated with coating (c), and wherein the thermoplastic polymeric composition has a tensile modulus of at least about 11 GPa, as measured by ISO method 527-2:1993 at a rate of 5 mm/min on test specimens having a thickness of 4 mm; and a notched Charpy impact strength of at least about 35 kJ/m$^2$, as measured by ISO method 179-1:2000.

DETAILED DESCRIPTION OF THE INVENTION

The composite article of the present invention comprises a first component comprising a molded part comprising a thermoplastic polymeric composition onto at least one surface or partial surface thereof is adhered a thermoplastic polymeric film wherein the surface of the film that is opposite that adhered to the first component is coated or partially coated with a coating comprising paint.

The thermoplastic polymeric composition may comprise one or more thermoplastics. Examples of suitable thermoplastic polymers include, but are not limited to, polyamides, polyesters (including aromatic polyester and aliphatic polyester), liquid crystalline polyesters (LCP), poly(lactic acid) (including d,l-complexed poly(lactic acid)), polyolefins (such as polyethylene and polypropylene), polycarbonates, acrylonitrile-butadiene-styrene polymers (ABS), poly(phenylene oxide)s (PPO), poly(phenylene sulfide)s, polysulphones, polyarylates, polyetheretherketones (PEEK), polyetherketoneketones (PEKK), polyacetals, polystyrenes, and syndiotactic polystyrenes. Thermoplastic alloys, such as polyamide/poly(phenylene oxide) alloys, polyester/ABS alloys (including poly(butylene terephthalate)/ABS alloys)); polyester/polycarbonate alloys (including poly(butylene terephthalate)/polycarbonate alloys)); and polyester/poly(lactic acid) alloys (including poly(1,3-propylene terephthalate)/poly(lactic acid) alloys)) may be used.

Suitable polyamides can be condensation products of one or more dicarboxylic acids and one or more diamines, and/or one or more aminocarboxylic acids, and/or ring-opening polymerization products of one or more cyclic lactams. Polyamides may include aliphatic, aromatic, and/or semi-aromatic polyamides.

Suitable dicarboxylic acids include, but are not limited to, adipic acid, azelaic acid, terephthalic acid (abbreviated as "T" in polyamide designations), and isophthalic acid (abbreviated as "I" in polyamide designations). Preferred are dicarboxylic acids having 10 or more carbon atoms, including, but not limited to sebacic acid; dodecanedioic acid, tetradecanedioic acid, pentadecanedioic acid, and the like.

Suitable diamines include, but are not limited to, tetramethylenediamine; hexamethylenediamine; octamethylenediamine; nonamethylenediamine; 2-methylpentamethylenediamine; 2-methyloctamethylenediamine; trimethylhexamethylenediamine; bis(p-aminocyclohexyl) methane; m-xylylenediamine; and p-xylylenediamine. Preferred diamines have 10 or more carbon atoms, including, but not limited to decamethylenediamine; undecamethylenediamine; dodecamethylenediamine; tridecamethylenediamine; tetramethylenediamine; pentamethylenediamine; hexamethylenediamine; and the like.

A suitable aminocarboxylic acid is 11-aminododecanoic acid. Suitable cyclic lactams are caprolactam and laurolactam.

Preferred polyamides include aliphatic polyamides such as polyamide 6; polyamide 6,6; polyamide 4,6; polyamide 6,10; polyamide 6,12; polyamide 11; polyamide 12; polyamide 9,10; polyamide 9,12; polyamide 9,13; polyamide 9,14; polyamide 9,15; polyamide 6,16; polyamide 9,36; polyamide 10,10; polyamide 10,12; polyamide 10,13; polyamide 10,14; polyamide 12,10; polyamide 12,12; polyamide 12,13; polyamide 12,14; polyamide 6,14; polyamide 6,13; polyamide 6,15; polyamide 6,16; polyamide 6,13; and semi-aromatic polyamides such as poly(m-xylylene adipamide) (polyamide MXD,6) and polyetherethalamides such as poly(dodecamethylene terephthalamide) (polyamide 12,T), poly(decamethylene terephthalamide) (polyamide 10,T), poly(nonamethylene terephthalamide) (polyamide 9,T), hexamethylene adipamide/hexamethylene terephthalamide copolyamide (polyamide 6,T/6,6), hexamethylene terephthalamide/2-methylpentamethylene terephthalamide copolyamide (polyamide 6,T/D,T); hexamethylene adipamide/hexamethylene terephthalamide/hexamethylene isophthalamide copolyamide (polyamide 6,6/6,T/6,I); poly(caprolactam-hexamethylene terephthalamide) (polyamide 6/6,T); and copolymers and mixtures of these polymers.

Preferred thermoplastic polyesters (which have mostly, or all, ester linking groups) are normally derived from one or more dicarboxylic acids (or their derivatives such as esters) and one or more diols. In preferred polyesters the dicarboxylic acids comprise one or more of terephthalic acid, isophthalic acid, and 2,6-naphthalene dicarboxylic acid, and the diol component comprises one or more of $HO(CH_2)_nOH$ (I), 1,4-cyclohexanedimethanol, $HO(CH_2CH_2O)_mCH_2CH_2OH$ (II), and $HO(CH_2CH_2CH_2CH_2O)_zCH_2CH_2CH_2CH_2OH$ (III), wherein n is an integer of 2 to 10, m on average is 1 to 4, and z is on average about 7 to about 40. Note that (II) and (III) may be a mixture of compounds in which m and z, respectively, may vary and that since m and z are averages, they do not have to be integers. Other diacids that may be used to form the thermoplastic polyester include sebacic and adipic acids. Hydroxycarboxylic acids such as hydroxybenzoic acid may be used as comonomers. Specific preferred polyesters include poly(ethylene terephthalate) (PET), poly(1,3-propylene terephthalate) (PPT), poly(1,4-butylene terephthalate) (PBT), poly(ethylene naphthalate) (PEN), and poly(1,4-cyclohexyldimethylene terephthalate) (PCT), By a "liquid crystalline polymer" (abbreviated "LCP") is meant a polymer that is anisotropic when tested using the TOT test or any reasonable variation thereof, as described in U.S. Pat. No. 4,118,372, which is hereby included by reference. Useful LCP's include polyesters, poly(ester-amides), and poly(ester-imides). One preferred form of LCP is "all aromatic", that is all of the groups in the polymer main chain are aromatic (except for the linking groups such as ester groups), but side groups that are not aromatic may be present.

LCP's are typically derived from monomers that include aromatic hydroxycarboxylic acids, aromatic dicarboxylic acids, aliphatic dicarboxylic acids, aromatic diols, aliphatic diols, aromatic hydroxyamines, and aromatic diamines. For example, they may be aromatic polyesters that are obtained by polymerizing one or two or more aromatic hydroxycarboxylic acids; aromatic polyesters obtained by polymerizing aromatic dicarboxylic acids, one or two or more aliphatic dicarboxylic acids, aromatic diols, and one or two or more aliphatic diols, or aromatic hydroxycarboxylic acids; aromatic polyesters obtained by polymerizing one or two or more monomers selected from a group including aromatic dicarboxylic acids, aliphatic dicarboxylic acids, aromatic diols, and aliphatic diols, aromatic polyester amides obtained by polymerizing aromatic hydroxyamines, one or two or more aromatic diamines, and one or two or more aromatic hydroxycarboxylic acids; aromatic polyester amides obtained by polymerizing aromatic hydroxyamines, one or two or more aromatic diamines, one or two or more aromatic hydroxycarboxylic acids, aromatic dicarboxylic acids, and one or two or more aliphatic carboxylic acids; and aromatic polyester amides obtained by polymerizing aromatic hydroxyamines, one or two or more aromatic diamines, one or two or more aromatic hydroxycarboxylic acids, aromatic dicarboxylic acids, one or two or more aliphatic carboxylic acids, aromatic diols, and one or two or more aliphatic diols.

Examples of aromatic hydroxycarboxylic acids include 4-hydroxybenzoic acid, 3-hydroxybenzoic acid, 2-hydroxybenzoic acid, 6-hydroxy-2-naphthoic acid, and halogen-, alkyl-, or allyl-substituted derivatives of hydroxybenzoic acid.

Examples of aromatic dicarboxylic acids include terephthalic acid; isophthalic acid; 3,3'-diphenyl dicarboxylic acid; 4,4'-diphenyl dicarboxylic acid; 1,4-naphthalene dicarboxylic acid; 1,5-naphthalene dicarboxylic acid; 2,6-naphthalene dicarboxylic acid; and alkyl- or halogen-substituted aromatic dicarboxylic acids, such as t-butylterephthalic acid, chloroterephthalic acid, etc.

Examples of aliphatic dicarboxylic acids include cyclic aliphatic dicarboxylic acids; such as trans-1,4-cyclohexane dicarboxylic acid; cis-1,4-cyclohexane dicarboxylic acid; 1,3-cyclohexane dicarboxylic acid; and substituted derivatives thereof.

Examples of aromatic diols include hydroquinone; biphenol; 4,4'-dihydroxydiphenyl ether; 3,4'-dihydroxydiphenyl ether; bisphenol A; 3,4'-dihydroxydiphenylmethane; 3,3'-dihydroxydiphenylmmethane; 4,4'-dihydroxydiphenylsulfone; 3,4'-dihydroxydiphenylsulfone; 4,4'-dihydroxydiphenylsulfide; 3,4'-dihydroxdiphenylsulfide; 2,6'-naphthalenediol; 1,6'-naphthalenediol; 4,4'-dihydroxybenzophenone; 3,4'-dihydroxybenzophenone; 3,3'-dihydroxybenzophenone; 4,4'-dihydroxydiphenyldimethylsilane; and alkyl- and halogen-substituted derivatives thereof.

Examples of aliphatic diols include cyclic, linear, and branched aliphatic diols, such as trans-1,4-hexanediol; cis-1,4-hexanediol; trans-1,3-cyclohexanediol; cis-1,2-cyclohexanediol; ethylene glycol; 1,4-butanediol; 1,6-hexanediol; 1,8-octanediol; trans-1,4-cyclohexanedimethanol; cis-1,4-cyclohexanedimethanol; etc., and substituted derivatives thereof.

Examples of aromatic hydroxyamines and aromatic diamines include 4-aminophenol, 3-aminophenol, p-phenylenediamine, m-phenylenediamine, and substituted derivatives thereof.

Poly(lactic acid) (PLA) includes poly(lactic acid) homopolymers and copolymers of lactic acid and other monomers containing at least 50 mole % of repeat units derived from lactic acid or its derivatives and mixtures thereof having a number average molecular weight of 3,000 to 1,000,000, 10,000 to 700,000, or 20,000 to 600,000. The poly(lactic acid) may contain at least 70 mole % of repeat units derived from (e.g. made by) lactic acid or its derivatives. The poly(lactic acid) homopolymers and copolymers can be derived from d-lactic acid, l-lactic acid, or a mixture thereof. A mixture of two or more poly(lactic acid) polymers can be used. Poly(lactic acid) may be prepared by the catalyzed ring-opening polymerization of the dimeric cyclic ester of lactic acid, which is referred to as "lactide." As a result, poly(lactic acid) is also referred to as "polylactide."

Copolymers of lactic acid are typically prepared by catalyzed copolymerization of lactic acid, lactide or another lactic acid derivative with one or more cyclic esters and/or dimeric cyclic esters.

The thermoplastic polymer is preferably present in the composition in about 20 to about 60 weight percent, or preferably in about 30 to about 50 weight percent, or more preferably in about 30 to about 40 weight percent, based on the total weight of the composition.

The compositions comprise at least one reinforcing agent. Suitable reinforcing agents include fibrous reinforcing agents such as glass fibers, carbon fibers, and mineral fibers such as wollastonite. Preferred are long fibers, such as glass or carbon fibers that have a number average length of about 2 to about 7 mm after the composition has been formed into the first component. The composition may contain reinforcing agents and fillers in platy, granular, beadlike, and other forms, such as talc, mica, kaolin, glass beads, glass flakes, and the like. The composition may contain nanoparticulate reinforcing agents and fillers such as carbon nanotubes and nanoclays, including montmorillonite and sepiolite.

The reinforcing agent is preferably present in the composition in about 40 to about 80 weight percent, or preferably in about 50 to about 70 weight percent, or more preferably in about 60 to about 70 weight percent, based on the total weight of the composition.

The compositions may comprise electrically conductive additives such as carbon black, carbon fibers, metal-coated carbon fibers, carbon nanotubes, and ion conductive polymeric systems, such as those comprising ion conductive polymers and ion sources. Ion conductive polymers include polyetheresteramides and polyesteramide block copolymers. Ion sources include sodium, potassium, and lithium salts. The ion source is preferably present in at least about 200 ppm or more preferably in at least about 1000 ppm relative to the ion conductive polymer.

The composition may contain additional components such as flame retardants, flame retardant synergists, impact modifiers, stabilizers (such as oxidation, heat, ultraviolet light, etc. stabilizers), colorants (including pigments, dyes, and carbon black), plasticizers, thermally conductive additives, lubricants, nucleating agents, and the like.

The composition used in the present invention is made by melt-blending the components using any known methods. The component materials may be mixed to uniformity using a melt-mixer such as a single or twin-screw extruder, blender, kneader, Banbury mixer, etc. to give a resin composition. Or, part of the materials may be mixed in a melt-mixer, and the rest of the materials may then be added and further melt-mixed until uniform.

The composition has a tensile modulus of at least about 11 GPa, or preferably of at least about 13 GPa, or more preferably of at least about 14 GPa, or yet more preferably of at least about 17 GPa. Tensile modulus is measured according to ISO method 527-2:1993 at a rate of 5 mm/min on test specimens having a thickness of 4 mm.

The composition has a notched Charpy impact strength of at least about 35 $kJ/m^2$, or preferably of at least about 40 $kJ/m^2$, or more preferably of at least about 50 $kJ/m^2$, or yet more preferably of at least about 60 $kJ/m^2$, Notched Charpy impact strength is measured according to ISO method 179-1:2000 using a hammer size between 2.0 and 7.5 Joules, inclusive.

The composition preferably has a coefficient of thermal linear expansion of less than or equal to about $50 \times 10^{-6}$/K at 20° C., or more preferably of less than or equal to about $40 \times 10^{-6}$/K at 20° C., or yet more preferably of less than or equal to about $30 \times 10^{-6}$/K at 20° C., or still more preferably of less than or equal to about $20 \times 10^{-6}$/K at 20° C.

The thermoplastic polymeric film may have a single layer or comprise two or more layers, where the two or more layers may be the same or different materials. Where two or more layers are used, one layer may be selected to serve as a tie layer to enhance adhesion of the film to the surface of the first component. As will be understood by those skilled in the art, the composition of the film may be selected to optimize adhesion to the composition of the first component.

The films typically have a thickness of about 8 to about 20 mil. The films are preferably unfilled or filled with nanoparticulate fillers such as nanoclays or electrically conductive fillers, provided that any fillers used do not detract from the surface appearance of the resulting composite article. Examples of electrically conductive fillers include electroconductive or electrostatically dissipative carbon blacks and ion conductive polymers with one or more ion sources.

The nanoclays may be layered silicates, and preferably aluminum and/or magnesium silicates. The nanoclays may be in the form of fibrils, platelets, or other shapes and have a diameter in the range of about 10 to about 5000 nm. The layer thickness is less than about 2 nm. The nanoclays will preferably be swellable clays, meaning that the clays have the ability to absorb water or other polar organic liquids such as methanol and ethanol between the layers. When the liquids are absorbed, the nanoclays swell. At least one dimension of the nanoclay particles will be less than about 20 nm, and preferably less than about 5 nm. The nanoclays contain interlayer cations such as alkali and alkaline earth metal cations. Preferred cations include sodium and calcium ions. The nanoclays are used in an untreated form, meaning that they are not treated with an agent, such as a surfactant, to exchange metal cations present between the layers with organic cations such as ammonium or other onium ions.

Preferred nanoclays are fibrils having number average diameters less than or equal to about 70 nanometers and number average lengths of up to about 1000 nanometers. Examples of preferred nanoclays include sepiolite and smectite clays such as montmorillonite, hectorite, saponite, beidelilite, nontronite, bentonite, saponite, and the like. Both natural and synthetic nanoclays may be used. Natural nanoclay such as Cloisite® Na+ and synthetic smectite clays such as Laponite® are available from Southern Clay Products.

Electroconductive carbon blacks may include electroconductive furnace blacks. It is preferable that the electroconductive carbon black have a specific surface area of at least about 700 $m^2$/g and an oil absorption of from 2 to 4 mL/g. Suitable electroconductive carbon blacks include Ketjenblack® products supplied by Akzo Nobel.

Preferred films comprise polyesters such as poly(ethylene terephthalate) and polyamides, including polyterephthalamides such as hexamethylene adipamide/hexamethylene terephthalamide copolyamide (polyamide 6,T/6,6) and hexamethylene terephthalamide/2-methylpentamethylene terephthalamide copolyamide (polyamide 6,T/D,T).

Examples of suitable components for use as a tie layer include, but are not limited to, ethylene/vinyl alcohol copolymers, ethylene/vinyl acetate copolymers, ethylene/vinyl alcohol/vinyl acetate copolymers, and ionomeric polymers. The ionomeric polymers preferably comprise about 90 to 99 mole percent of repeat units derived from olefins and about 1 to 10 mole percent of repeat units derived from $\alpha,\beta$-ethylenically unsaturated monomers having carboxylic moieties wherein the moieties are considered as acid equivalents and are neutralized with metal ions having valences of 1 to 3, inclusive, where the carboxylic acid equivalent is monocarboxylic and are neutralized with metal ions having a valence of 1 where the carboxylic acid equivalent is dicarboxylic. To control the degree of neutralization, metal ions are present in an amount sufficient to neutralize at least 10 percent of the carboxyl moieties. Ionomeric polymers are described in greater detail in U.S. Pat. No. 3,264,272. Ionomeric polymers are supplied under the tradename Surlyn® by E.I. du Pont de Nemours and Co., Wilmington, Del.

Fillers may be added to the polymeric materials comprising the film by any suitable melt-blending method, such as extrusion. The films may be formed using any suitable method known in the art.

The composite articles are preferably formed by molding the composition of the of the first component into the form of a part onto a surface of the film. The film may be used flat, curved, bent, or in any other suitable preformed shape. The film may be preformed into a shape by any method known in the art, including thermoforming.

Such molding may be done by placing the film into a mold and overmolding the composition of the component onto the surface of the film, Suitable molding methods include, but are not limited to, injection molding, compression-injection molding, and compression molding. The composite articles may also be made coextruding the film and the composition of the first component. All or part of the surface of the composite article may comprise the film.

The coating (paint) is applied to all or a portion of surface of the film opposite the surface that is adhered to the first component. The coating may also be applied to all or portions of surfaces of the article that that do not contain the film. The coating used may be of any type, including water borne or organic solvent borne coatings. The coatings may be of a type (such as a lacquer type) that does not cure; a type that cures at room temperature; or a type that may require elevated temperature to cure. The coating may be clear or pigmented. The coating may be applied in any conventional fashion, such as rolled on, brushed on, sprayed on (with or without electrostatic assistance), or coated by immersion in a liquid coating or immersion in a fluidized bed.

The coating (paint) may be applied as more than one layer. In such cases, a first coating layer will be applied to the desired portion of the surface of the film and subsequent layers will be applied on top of the first coating layers. All such multiple coating layers are considered to be a part of the coating used in the present invention.

The surface smoothness of the portion of the surface of the composite article comprising the coated film may be evaluated using wave scan testing using a BYK-Gardner wave scan DOI instrument. Wave scan testing measures a surface profile of painted surfaces using wavelengths of 0.1-0.3 mm (Wa); 0.3-1 mm (Wb), 1-3 mm (Wc), 3-10 mm (Wd); and 10-30 mm (We). Wb is used to evaluate the telegraphing of a substrate surface profile through paint films. A Wb of less than 30 indicates that a paint film sufficiently hides the substrate profile and provides a class A surface appearance. The surface of the coated film preferably has a Wb value of less than or equal to about 40, or more preferably of less than or equal to about 30, or yet more preferably of less than or equal to about 20, or still more preferably of less than or equal to about 10.

The composite articles of the present invention may be used as automotive body panels and other components including fenders, quarter panels, door panels, trunk lids, spoilers, hoods, roofs, bumpers, dashboards, interior panels, interior trim parts, gas caps, wheels, wheel covers, and hubcaps. The articles may be used as lids, covers, bodies, panels, and the like for large appliances such as refrigerators, washing machines, clothes dryers, dishwashers, and the like and small appliances such as electric mixers, steam irons, toasters, microwave ovens, and the like. The articles may also be used in boxes, housings, cabinets, panels and the like for power tools and electronic devices such as mobile telephones, wired telephones, cordless telephones, computers, keyboards, computer monitors, televisions, radios, computer printers, stereo systems, video cassette players, DVD player, and the like. The articles may be used as panels, hoods, housings, casings, engine covers, and the like for motorboat engines, motorcycles, snow mobiles, all-terrain vehicles, jet-skis, farm machinery, and yard maintenance equipment such as lawn mowers, edgers, blowers (including snow blowers), and the like. The articles may be used in furniture such as chairs, tables, and cabinets; in sporting goods such as skis, snowboards, skate boards; as containers for cosmetic articles; and in toys.

EXAMPLES

The films used in Examples 1-9 were prepared by melt-blending the ingredients shown in Table 1 in a ZSK 28 mm twin-screw extruder equipped with a film die and a casting drum. The films of Examples 1-4 were processed with a melt temperature of about 337° C. and the films of Examples 5-9 were processed with a melt temperature of about 275-281° C. The films were formed with the thicknesses shown in Table 1. The following components are referred to in Tables 1 and 2:

Polyamide A refers to a hexamethylene terephthalamide/2-methylpentamethylene terephthalamide copolyamide having a melting point of about 305-315° C.

PET A refers to Crystar® 3934, a poly(ethylene terephthalate) supplied by E.I. du Pont de Nemours and Co., Wilmington, Del.

Sepiolite refers to Pangel® S9, a nanodispersed sepiolite supplied by Tolsa, Spain.

Polyetheresteramide refers to Pelestat® 6321 refers to an static dissipating/antistatic composition supplied by Sanyo Chemical, Japan.

PA/PPO refers to Noryl® GTX 974, a polyamide/polyphenylene oxide alloy supplied by GE Plastics.

PET B refers to a poly(ethylene terephthalate) composition containing 2.5 weight percent electrically conductive carbon black, 12 weight percent of an ethylene/n-butyl acrylate/glycidyl methacrylate copolymer impact modifier, 5 weight percent wollastsonite, and 0.3 weight percent antioxidants, and 0.5 weight percent lubricant.

Polyamide B refers to Zytel® HTN51 LG50 BK083, a polyterephthalamide composition reinforced with long glass fibers supplied by E.I. du Pont de Neumours & Co., Wilmington, Del.

Each film was cut into a 5×5 inch square and placed into the bottom of a injection mold having an edge gated cavity and that forms a plaque having dimensions of 5×5×0.125 inches and suitable for use in Dynatup impact testing. The films were overmolded with Zytel® HTN51 LG50 BK083 in an injection molding machine. The barrel temperatures of the molding machine were set to achieve a resin melt temperature of about 320 to about 325° C. and the resulting melt temperature was about 323-324° C. The mold temperatures were about 152 to 153° C. for Examples 1-4; about 76-77° C. for Example 5; and about 82-83° C. for Examples 6-9.

In the case of Comparative Example 1, Zytel® HTN51LG50 BK083 was molded into test specimens using the same mold as was used for overmolding films without the presence of a film. In the case of Comparative Example 2, a steel sheet was painted and its surface appearance measured.

In the cases of Comparative Examples 3-6, the polymer compositions indicated in Table 2 were molded into test specimens as described above for Comparative Example 1. In the cases of Comparative Example 7 and Example 10, Zytel® HTN51 LG50 BK083 was overmolded onto 10 mil films prepared from PET A.

The film surface of the molded plaques of Examples 1-9 and one side of the plaques of Comparative Example 1 were painted as follows. The plaque was attached vertically to a steel frame. The panel was sprayed with a Primer Surfacer (#176-2477, E. I DuPont de Nemours & Co., Inc., Wilmington, Del. 19898, U.S.A.) using an electrostatic bell (77 mm Serrated Toyota Cartridge Bell, ABB Inc, Norwalk, Conn. 06851, USA, 30,000 rpm) at −90 kV with a paint flow rate of 150 mL/min. The distance between the bell and the panel was 300 mm. Two coats were applied for 80 sec with a 15 sec flash time in between coats. Dry film build was 28-35 μm. The sample was flashed for 7 min, baked in an electric oven at 140° C. for 20 min.

The plaque was rehung vertically and electrostatically sprayed with a black waterborne basecoat (202 Black, E. I. DuPont de Nemours & Co., Inc., Wilmington, Del. 19898, U.S.A.) using an electrostatic bell (65 mm Behr Bell, Durr Industries, Inc., Plymouth, Mich. 48170, USA, 42,500 rpm) at −60 kV with a paint flow rate of 160 mL/min. The distance between the bell and the panel was 300 mm. Two coats were applied for 130 sec with a 70 sec flash time in between coats. Dry film build was 10-15 μm. The sample was flashed for 90 sec, and baked in an electric oven at 104° C. for 4 min.

The plaque was rehung vertically and electrostatically sprayed with a clearcoat (Kino Clearcoat RC-8139, E. I. DuPont de Nemours & Co., Inc., Wilmington, Del. 19898, U.S.A.) using an electrostatic bell (55 mm serrated Behr Bell, Durr Industries, Inc., 42,500 rpm) at −85 kV with a paint flow rate of 205 mL/min. The distance between the bell and the panel was 300 mm. One coat was applied for 60 sec. Dry film build was 30-35 μm. The sample was flashed for 7 min, and baked in an electric oven at 140° C. for 20 min.

Samples were painted as molded or after annealing at 200° C. for 40 min. Test results for unannealed and annealed samples are given in Table 1.

The painted surfaces of the test specimens were evaluated using wave scan DOI (distinctness of image) testing measured with a Wavescan DOI Instrument (manufactured by BYK-Gardner, 9104 Guilford Road, Columbia, Md. 21046). Wave scan DOI measures surface profiles in increments of 0.1-0.3 mm (Wa); 0.3-1 mm (Wb), 1-3 mm (Wc), 3-10 mm (Wd); and 10-30 mm (We). The results are shown in Table 1.

The adhesion of the paint to the resulting painted articles was tested using a peel test (ASTM D33359 Method B: Cross-Cut Tape Test). The number of scored squares that were removed during the test relative to the total number of squares are shown in Table 1 under the heading of "Adhesion failure rate." In the case of Examples 8 and 9, samples were also immersed in water at room temperature for about 1 week prior to paint adhesion testing. The results are given in Table 1 under the heading of "Adhesion failure rate after water immersion."

The test specimens were tested for Dynatap impact resistance following method ISO 6603-2 using a 40 mm support ring and a 20 mm tup at 2.2 m/sec velocity at room temperature or at −40° C. The results are given in Table 1 (where all samples were measured at room temperature) and Table 2. The impact testing for Examples 1-9 was done on the painted samples.

TABLE 1

|  | Ex. 1 | Ex. 2 | Ex. 3 | Ex. 4 | Ex. 5 | Ex. 6 | Ex. 7 | Ex. 8 | Ex. 9 | Comp. Ex. 1 | Comp. Ex. 2 |
|---|---|---|---|---|---|---|---|---|---|---|---|
| Polyamide A | 97 | 97 | 94 | 94 | — | — | — | — | — | — | — |
| PET A | — | — | — | — | 100 | 97 | 97 | 82 | 82 | — | — |
| Sepiolite | 3 | 3 | 6 | 6 | — | 3 | 3 | 3 | 3 | — | — |
| Polyetheresteramide | — | — | — | — | — | — | — | 15 | 15 | — | — |
| Film thickness (mil) | 15 | 10 | 15 | 10 | 10 | 10 | 15 | 10 | 15 | — | — |
| Unannealed samples |  |  |  |  |  |  |  |  |  |  |  |
| Surface gloss (DOI) | 98 | 98.6 | 98.9 | 95.8 | 96.4 | 82.4 | 99.3 | 89.8 | 97.1 | 49.4 | 97.9 |
| Surface appearance (Wa) | 1.9 | 2.3 | 2.9 | 9.7 | 2.1 | 9.7 | 1.3 | 5 | 2 | 51.3 | 6.0 |
| Surface appearance (Wb) | 8.2 | 7.1 | 7.6 | 17.6 | 17.6 | 38.5 | 6.5 | 30.2 | 13.5 | 51.2 | 10.7 |
| Adhesion failure rate | 15/100 | 100/100 | 15/100 | 65/100 | 0/100 | 0/100 | 0/100 | 0/100 | 0/100 | — | — |
| Adhesion failure rate after water immersion. | — | — | — | — | — | — | — | 0/100 | 0/100 | — | — |
| Impact strength (J) | 26 | 24 | 26 | 23 | 25 | 24 | 22 | 31 | 22 | 31 | — |
| Annealed samples |  |  |  |  |  |  |  |  |  |  |  |
| Surface gloss (DOI) | 98.4 | 97 | 88.2 | 89.6 | 97.6 | 93.7 | 98.6 | 97.7 | 99.6 | 50.8 | — |
| Surface appearance (Wa) | 2.3 | 4.1 | 15.1 | 10.1 | 2.2 | 7.1 | 2 | 1.7 | 1 | 55.4 | — |
| Surface appearance (Wb) | 9.5 | 10.7 | 18.6 | 21.1 | 15.9 | 27.2 | 6.4 | 22.1 | 8.7 | 56.6 | — |
| Adhesion failure rate | 5/100 | 5/100 | 5/100 | 30/100 | 65/100 | 0/100 | 0/100 | 0/100 | 0/100 | — | — |
| Adhesion failure rate after water immersion. | — | — | — | — | — | — | — | 0/100 | 0/100 | — | — |

Ingredient quantities are given in weight percentage relative to the total weight of the composition.

TABLE 2

|  | Comp. Ex. 3 | Comp. Ex. 4 | Comp. Ex. 5 | Comp. Ex. 6 | Comp. Ex. 7 | Ex. 10 |
|---|---|---|---|---|---|---|
| Polymer | PA/PPO | PA/PPO | PET B | PET B | Polyamide B | Polyamide B |
| Overmolded on a film? | no | no | no | no | yes | yes |
| Painted? | no | yes | no | yes | no | yes |
| Impact strength |  |  |  |  |  |  |
| @ 23° C. (J) | 51 | 6 | 36 | 5.5 | 31 | 30 |
| @ −40° C. (J) | 6 | shattered | 5 | shattered | 26 | A hole was punched in the test specimen |

What is claimed is:

1. A molded article comprising a thermoplastic polymer composition, said molded article prepared by a process comprising the following steps:
(a) placing a thermoplastic polymeric film of about 8 mils to about 20 mils thickness comprising at least one polyester or polyamide having first and second surfaces opposite to each other into a mold;
(b) overmolding onto the first surface of the thermoplastic polymeric film a thermoplastic polymeric composition comprising from about 20 to about 60 percent by weight of at least one thermoplastic polymer and from about 40 to about 80 percent by weight of at least one reinforcing agent;
(c) coating the second surface of the thermoplastic polymeric film with a coating having a total dry film build of 68 μm to 85 μm to provide a molded article;
wherein the reinforcing agent has a fiber length of 2 mm to 7 mm after overmolding;
wherein the surface of the coating on the thermoplastic polymer film of the molded article has a Wb value of 30 or less as measured by a BYK-Gardner wave scan DOI instrument; and wherein the thermoplastic polymeric composition having a tensile modulus of at least about 11 GPa, as measured by ISO method 527-2:1993 at a rate of 5 mm/min on test specimens having a thickness of 4 mm; a notched Charpy impact strength of at least about 35 kJ/m$^2$, as measured by ISO method 179-1:2000.

2. The molded article of claim 1, wherein the thermoplastic polymer composition comprises at least one polyamide and/or at least one polyester.

3. The molded article of claim 2, wherein the polyamide is a semi-aromatic polyamide.

4. The molded article of claim 3, wherein the semi-aromatic polyamide is hexamethylene adipamide/hexamethylene terephthalamide copolyamide and/or hexamethylene terephthalamide/2-methylpentamethylene terephthalamide copolyamide.

5. The molded article of claim 2, wherein the polyester is one or more of poly(ethylene terephthalate), poly(1,3-propylene terephthalate), poly(1,4-butylene terephthalate), poly(ethylene naphthalate), and poly(1,4-cyclohexyldimethylene terephthalate).

6. The molded article of claim 1, wherein the reinforcing agent is glass fibers and/or carbon fibers.

7. The molded article of claim 1, wherein the thermoplastic polymeric composition comprises about 30 to about 50 weight percent thermoplastic polymer and about 50 to about 70 weight percent reinforcing agent.

8. The molded article of claim 1, wherein the thermoplastic polymeric composition has a tensile modulus of at least about 13 GPa.

9. The molded article of claim 1, wherein the thermoplastic polymeric composition has a notched Charpy impact strength of at least about 40 kJ/m$^2$.

10. The molded article of claim 1, wherein the polyamide or polyester of the thermoplastic polymeric film comprises poly(ethylene terephthalate); hexamethylene adipamide/hexamethylene terephthalamide copolyamide; and/or hexamethylene terephthalamide/2-methylpentamethylene terephthalamide copolyamide.

11. The molded article of claim 1, wherein the thermoplastic polymeric film comprises at least one nanoclay in the shape of fibrils having number average diameters less than or equal to about 70 nanometers and number average lengths of up to about 1000 nanometers.

12. The molded article of claim 11, wherein the nanoclay is sepiolite and/or montmorillonite.

13. The molded article of claim 1, wherein the thermoplastic polymeric film comprises electroconductive carbon black having a surface area of at least 700 m2/g and an oil absorption of from 2 to 4 mL/g.

14. The molded article of claim 1, wherein the thermoplastic polymeric film comprises at least one ion conductive polymer.

15. The molded article of claim 14, wherein the ion conductive polymer is at least one polyetheresteramide.

16. The molded article of claim 1, wherein the thermoplastic polymeric film comprises at least one layer comprising ethylene/vinyl alcohol copolymers, ethylene/vinyl acetate copolymers, ethylene/vinyl alcohol/vinyl acetate copolymers, and/or ionomeric polymers.

* * * * *